United States Patent [19]

Kurihara et al.

[11] Patent Number: 4,681,070
[45] Date of Patent: Jul. 21, 1987

[54] SUCTION GAS HEATER CONTROL DEVICE FOR ENGINES

[75] Inventors: Norimitsu Kurihara, Wako; Masaaki Ozaki, Utsunomiya; Hiroshi Goto, Asaka; Masahiko Asakura, Tokorozawa, all of Japan

[73] Assignee: Honda Giken Kogyo Kabushiki Kaisha, Tokyo, Japan

[21] Appl. No.: 738,327

[22] Filed: May 28, 1985

[30] Foreign Application Priority Data

May 28, 1984 [JP] Japan .................................. 59-107940
May 28, 1984 [JP] Japan .................................. 59-107941

[51] Int. Cl.$^4$ ............................................ F02M 31/12
[52] U.S. Cl. .................................. 123/179 H; 123/552
[58] Field of Search ............... 123/179 H, 179 B, 552, 123/549

[56] References Cited

U.S. PATENT DOCUMENTS

| | | | |
|---|---|---|---|
| 3,373,726 | 3/1968 | Albrecht | 123/179 H |
| 3,809,045 | 5/1974 | Frankle | 123/179 H |
| 4,399,781 | 8/1983 | Tsukasaki | 123/179 H |
| 4,433,665 | 2/1984 | Abe et al. | 123/552 |

Primary Examiner—Andrew M. Dolinar
Attorney, Agent, or Firm—Armstrong, Nikaido, Marmelstein & Kubovcik

[57] ABSTRACT

A suction gas heater control device for an engine comprising first detector for detecting when the engine is brought into complete firing, and for providing a signal in response thereto; a first timer coupled to the output of the first detector for continuously providing a first operating signal for a predetermined period of time after a first period of time, the first period of time starting with the beginning of the inputting of a signal from the first detector and ending with the stopping of the signal from the first detector; a second detector for detecting engine temperature and for providing a second operating signal when the engine temperature is lower than a predetermined level; and a judgement circuit means coupled to the first timer and the second detector for providing a signal for operating a suction gas heater, when the first operating signal is applied thereto and when the second operating signal which indicates that at least one of the temperature of the engine is lower than a predetermined level.

5 Claims, 4 Drawing Figures

SUCTION GAS HEATER CONTROL DEVICE FOR ENGINES

BACKGROUND OF THE INVENTION

1. Field of the Invention

This invention relates to a suction gas heater control device for engines.

2. Description of the Prior Art

When a suction gas and fuel are supplied at a low temperature to an engine when the engine is started at a low temperature, the fuel is supplied, in an insufficiently-atomized state, into a combustion chamber in the engine. This causes an increase in the engine-starting time and the rate of generation of carbon monoxide and hydrocarbon, and a decrease in the drivability. In order to eliminate these inconveniences, a suction gas heater has been provided in a suction passage in the engine. This suction gas heater is controlled so as to be operated when the engine is brought into complete firing, which is expressed, for example, such that the engine is rotating at a speed above a predetermined level, and when the water temperature in the engine is not higher than a predetermined level.

An engine, which is stalled after it was started at a low temperature, can be restarted immediately with ease if a suction gas-heating operation is carried out.

SUMMARY OF THE INVENTION

An object of the present invention, which has been developed in view of the above-mentioned facts, is to provide a suction gas heater control device for an engine, which enables a suction gas to be heated for a predetermined period of time after the engine has been brought into stall after complete firing, and the engine can thus be restarted with ease after stalling.

The device according to the present invention includes a timer adapted to continuously provide a first operating signal for a predetermined period of time, which period starts with the beginning of the inputting of a signal representative of complete firing of an engine and which ends after a first period of time has elapsed from the stopping of the complete firing signal. A judgement circuit is adapted to provide a signal for operating a suction gas heater, on the basis of the first operating signal and a second operating signal which indicates that the temperature of the engine is not higher than a predetermined level. With the device of the present invention, the suction gas is heated for a predetermined period of time even after the engine has been stalled. Accordingly, during this time, the engine can be restarted easily.

The above and other objects as well as the advantageous features of the invention will become apparent from the following description of the preferred embodiments taken in conjunction with the accompanying drawings.

BRIEF DESCRIPTION OF THE DRAWINGS

FIGS. 1-3 show an embodiment of the present invention, wherein:

FIG. 1 is an electric circuit diagram thereof;

FIG. 2, is a diagram showing the characteristics of a first timer; and

FIG. 3 is a diagram showing the characteristics of a second timer.

DESCRIPTION OF THE PREFERRED EMBODIMENTS

Figure 1:
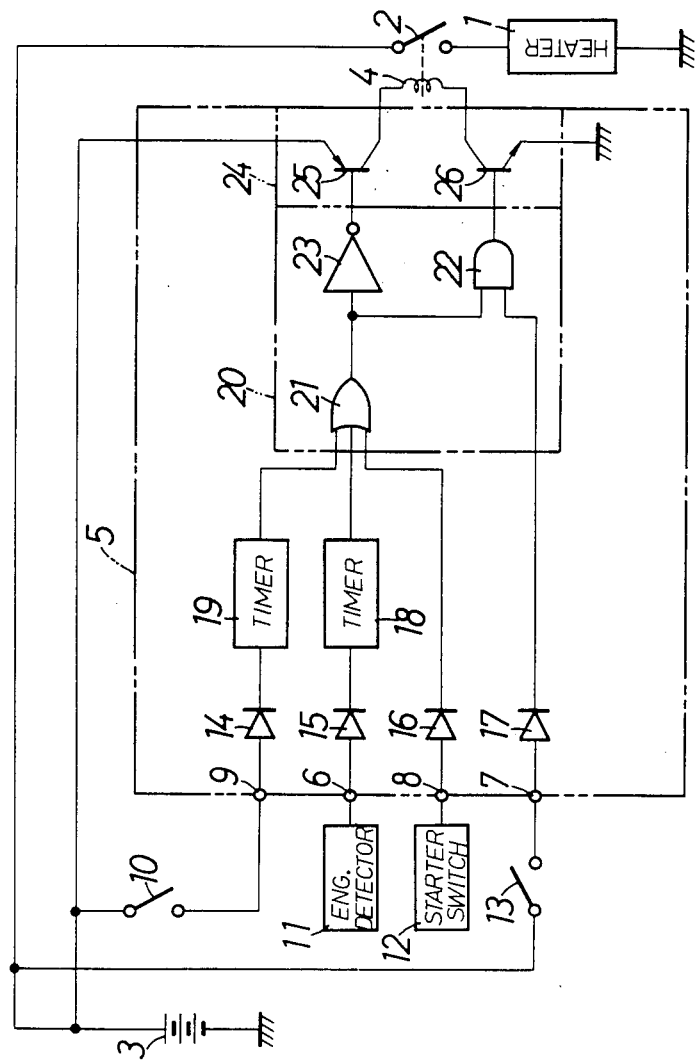

Referring to FIG. 1, which shows a first embodiment of the present invention, a suction gas heater 1 is provided in an intermediate portion of an intake manifold (not shown) of an engine, and is connected to a battery 3 through a relay switch 2. The excitation and deexcitation of a relay coil 4, which is part of a relay with the relay switch 2, is controlled by a control device 5 according to the present invention. When the relay coil 4 is excited, the relay switch 2 is closed to cause the suction gas heater 1 to be electrically actuated.

The control device 5 has first to fourth input terminals 6–9. A detector 11 for detecting a condition indicating the complete firing of engine as expressed by the engine of any particular operation mode, for example, an L-terminal of an IC regulator in an AC generator is connected to the first input terminal 6. In other words, in this embodiment, the detector 11 detects complete firing of the engine through operation of the AC generator, but as alternative measures the complete firing of engine can be detected from the engine RPM or from the level of negative pressure in the intake manifold of the engine. Thus, when the engine is placed in complete firing, a high level signal representative of this state of operation of the engine is applied from the detector 11 to the first input terminal 6. A switch 13 for detecting the temperature of water in the engine is connected to the second input terminal 7. This temperature detecting switch 13 is closed when the temperature of water in the engine is lower than a predetermined level, for example, 65° C., to apply a second operating signal of a high level to the second input terminal 7. A starter switch 12 is connected to the third input terminal 8. When the starter switch 12 is closed, a third operating signal of a high level is applied to the third input terminal 8. An ignition switch 10 is connected to the fourth input terminal 9, and, when the former is turned on, a high level signal is applied to input terminal 9.

Figure 2:
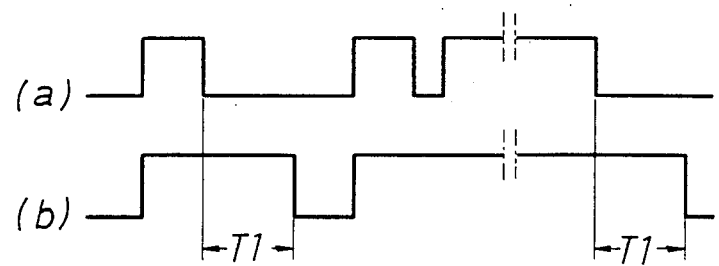

In the control device 5, the first input terminal 6 is connected to a first timer 18 through a diode 15. The first timer 18 is adapted to provide, when a high level signal (a) shown in FIG. 2, is applied thereto, a first operating signal (b) of a high level which rises in accordance with the rising of the input signal (a) and maintains the same condition for a first predetermined period of time T1, for example, 30 seconds after the input signal (a) has fallen, as shown in FIG. 2. Accordingly, when a period of time between the instant at which an input signal into the first timer 18 falls and an instant at which the same input signal rises again is not longer than the first predetermined time T1, an output from the first timer 18 continues to be at a high level.

Figure 3:
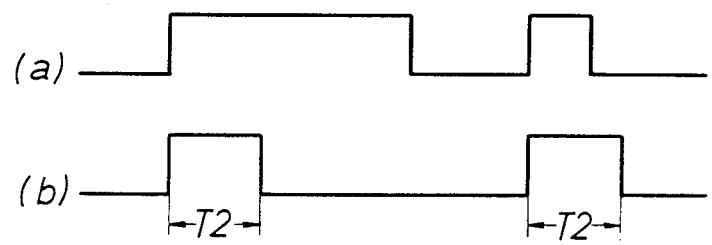

The fourth input terminal 9 is connected to the second timer 19 through a diode 14. The second timer 19 is adapted to provide, when a high level signal (a) shown in FIG. 3 is applied thereto, a fourth operating signal (b) at a high level which rises in accordance with the rising of the input signal (a) and maintains the same condition for a second predetermined period of time T2, for example, 30 seconds, as shown in FIG. 3.

The first to fourth operating signals are inputted into a judgement circuit 20 which consists of an OR gate 21, an AND gate 22 and a NOT gate 23. Namely, the outputs from the first and second timers 18 and 19 are applied to the OR gate 21, and the third operating signal applied to the third input terminal 8 is applied to the remaining input terminal of the OR gate 21 through a diode 16. An output from the OR gate 21 is applied to one input terminal of the AND gate 22, and also is inverted by the NOT gate 23. The second operating signal inputted into the second input terminal 7 is applied to the other input terminal of the AND gate 22 through a diode 17.

In the judgement circuit 20, when at least one of the first, third and fourth operating signals applied to the OR gate 21 is at a high level, and further, when the second operating signal is at a high level, a low-level signal is outputted from the NOT gate 23, and a high-level signal from the AND gate 22, so as to operate the suction gas heater 1.

An output from the judgement circuit 20 is applied to a switching circuit 24 which consists of a PNP transistor 25 and an NPN transistor 26. The PNP transistor 25 and the NPN transistor 26 are connected in series through the relay coil 4, and the emitter terminal of the PNP transistor 25 is connected to a positive pole of the battery 3. An output terminal of the NOT gate 23 is connected to the base of the PNP transistor 25, and an output terminal of the AND gate 22 to the base of the NPN transistor 26. Accordingly, in this switching circuit 24, the PNP transistor 25 is turned on when the level of an output from the NOT gate 23 is low, and the NPN transistor 26 is turned on when the level of an output from the AND gate 22 is high. When the transistors 25 and 26 are turned on, the relay coil 4 is excited to cause the relay switch 2 to be turned on and the suction gas heater 1 to be electrically actuated.

The operation of this embodiment will now be described. When the temperature of water in the engine is lower than 65° C., a second operating signal of a high level is applied to the second input terminal 7. When the ignition switch 10 is then turned on, or when the engine then attains a complete firing or when the starter then begins to be operated, a low-level signal is outputted from the NOT gate 23, and a high-level signal from the AND gate 22. Consequently, both of the transistors 25 and 26 are turned on, so that the relay coil 4 is excited. As a result, the relay switch 2 is turned on, and the suction gas heater 1 is electrically actuated.

While the engine is cold, the ignition switch 10 and the starter switch 12 are turned on before the engine has attained a complete firing. Since a suction gas is heated before the engine has attained independent operation, the fuel can be sufficiently atomized. This enables the starting performance and drivability of a vehicle to be improved.

Since a fourth operating signal of a high level is continuously outputted from the second timer 19 for a second predetermined time T2 after the ignition switch 10 has been turned on, the suction gas heater 1 can be actuated electrically at the same time that the ignition switch 10 is turned on. Also, when the ignition switch 10 is left in an ON-stage even after the second predetermined time T2 has elapsed, the supply of electric current to the suction gas heater 1 is stopped so as to avoid the wasteful consumption of electric power. This can prevent the battery 3 from being consumed unnecessarily. Moreover, since the suction gas heater 1 is actuated electrically at the same time that the starter switch 12 is turned on, the suction gas heater 1 can be actuated electrically concurrently with a cranking operation when the engine is started after the ignition switch 10 has been left in an ON-state as previously mentioned.

When the engine attains the complete firing, a first operating signal of a high level is outputted continuously from the first timer 18 for a period of time between an instant at which the engine is stalled and an instant at which the first predetermined time T1 elapses. Therefore, the suction gas heater 1 is actuated electrically until the temperature of water in the engine has increased after the engine is started. The heating of the suction gas improves the drivability of the vehicle after the low-temperature starting of the engine, and minimizes the contents of carbon monoxide and hydrocarbon in the exhaust gas. Even when the engine is stalled, the suction gas is heated until the first predetermined time T1 has elapsed so that restarting the engine is easy.

Another embodiment of the present invention may be made by connecting a suction gas temperature detecting switch to the second input terminal 7. The suction gas temperature detecting switch is adapted to be turned on when the temperature of the suction gas is lower than a predetermined level, and is used instead of the switch 13 for detecting the temperature of the water in the engine, or by designing the device so that a second operating signal of a high level is applied to the second input terminal 7 when both of the detecting switches have been turned on.

Figure 4:
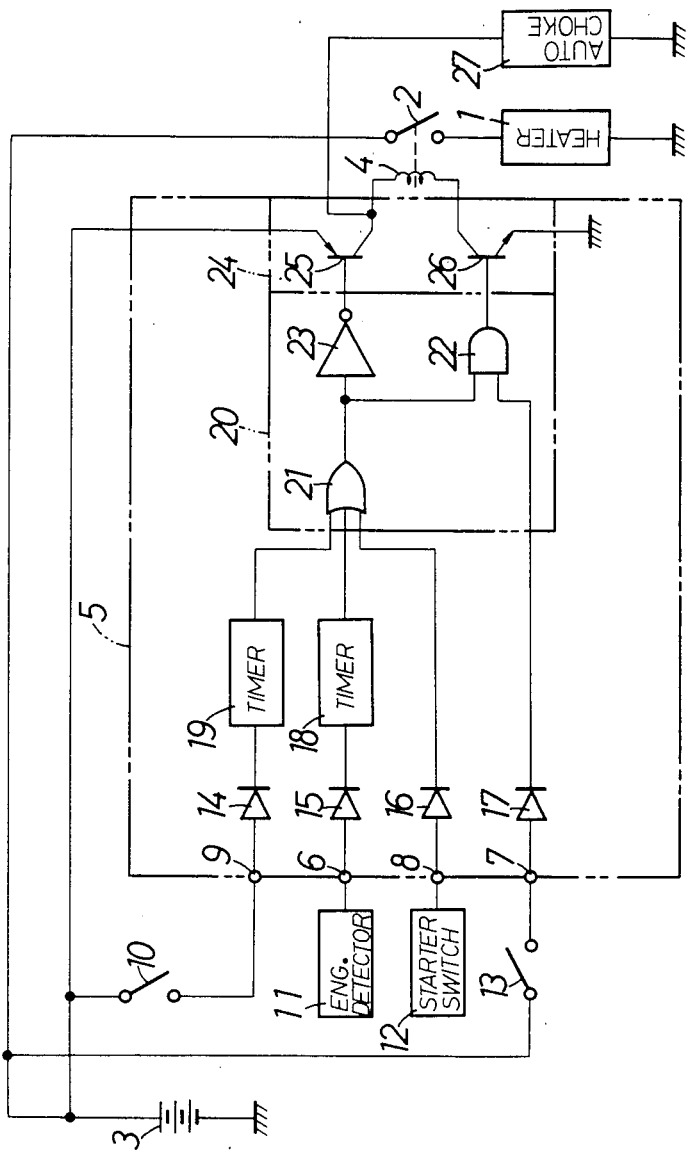
FIG. 4 is an electric circuit diagram of another embodiment of the present invention.

FIG. 4 shows still another embodiment of the present invention. The parts of this embodiment which correspond to those of the previously-described embodiment are designated by the same reference numerals. An auto-choke mechanism 27, which is adapted to be operated while the engine is cold, is connected to a control device 5 so that the auto-choke mechanism 27 can also be operated in accordance with a starting operation, which is carried out while the engine is cold, even before the engine is brought into complete firing.

The auto-choke mechanism 27 is provided with a heater, which is connected to a node between a PNP transistor 25 and a relay coil 4 in the switching circuit 24. Accordingly, when the PNP transistor 25 is turned on, the heater in the auto-choke mechanism 27 is actuated and starts operating.

According to this embodiment, the auto-choke mechanism 27 starts operating when an ignition switch 10 and a starter switch 12 are turned on, i.e., when the PNP transistor 25 is turned on. Therefore, the operation of the auto-choke mechanism 27 is started before the engine has attained its complete firing and the degree of opening of the choke is in accordance with the temperature of the heated suction gas. As a result, an optimum air-fuel ratio in accordance with the temperature of the suction gas can be obtained. This results in an improvement of the starting performance of the vehicle and the low-temperature drivability thereof, and the minimization of the fuel consumption and the contents of carbon monoxide and hydrocarbon in the exhaust gas.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A suction gas heater control device for an engine comprising first detector means for detecting when the engine has attained a complete firing, and for providing a signal in response thereto; a first timer means coupled to an output of said first detector means for continuously providing, upon receipt of said signal, a first operating signal for a period of time which starts with the beginning of inputting of said signal from the first detector means and ends after a first predetermined period of time has elapsed from the stopping of inputting of said signal; second detector means for detecting engine temperature and for providing a second operating signal when the engine temperature is lower than a predetermined level; and a judgement circuit means coupled to said first timer means and said second detector means for providing a signal for operating a suction gas heater when the first and second operating signals are applied thereto.

2. A suction gas heater control device for an engine according to claim 1, including a third detector means for detecting when an engine starter switch has been closed and for generating a third operating signal in response thereto, and wherein said judgement circuit provides an output signal for operating said suction gas heater, when at least one of the third operating signal and the first operating signal, and the second operating signal are applied thereto.

3. A suction gas heater control device for an engine according to claim 1, including a fourth detector means for detecting when an ignition switch has been closed and for generating a fourth operating signal in response thereto; a second timer means for receiving the fourth operating signal and generating an output signal for a second predetermined period of time after the ignition switch has been closed, the output of said second timer means being connected to said judgement circuit; and wherein said judgement circuit provides an output signal for operating said suction gas heater when at least one of said first operating signal and said fourth operating signal, and said second operating signal are applied thereto.

4. A suction gas heater control device for an engine according to claim 3, including a third detector means for detecting when an engine starter switch has been closed and for generating a third operating signal in response thereto, and wherein said judgement circuit provides an output signal for operating said suction gas heater, when at least one of the first, third and fourth operating signals, and the third operating signal are applied thereto. detector means.

5. A suction gas heater control device for an engine, comprising a detector means for detecting when an ignition switch has been closed and for generating a signal in response thereto; a timer means coupled to an output of said detector for receiving the signal and generating one operating signal for a predetermined period of time after the closure of said ignition switch; another detector means for detecting engine temperature below a predetermined level and for providing another operating signal in response thereto; a judgement circuit means coupled to said timer means and another detector means for providing a signal for operating a suction gas heater and an auto-choke means when said one and another operating signals are applied thereto.

* * * * *

UNITED STATES PATENT AND TRADEMARK OFFICE
CERTIFICATE OF CORRECTION

PATENT NO. : 4,681,070

DATED : July 21, 1987

INVENTOR(S) : KURIHARA et al

It is certified that error appears in the above-identified patent and that said Letters Patent is hereby corrected as shown below:

Claim 4, Column 6, line 17, "detector means." should be deleted.

Signed and Sealed this

Second Day of February, 1988

Attest:

DONALD J. QUIGG

*Attesting Officer*   Commissioner of Patents and Trademarks